United States Patent [19]

Arthur

[11] 4,323,450
[45] Apr. 6, 1982

[54] APPARATUS FOR SEPARATING A SOLID OR VISCOUS LIQUID COMPONENT FROM A MIXTURE

[75] Inventor: Geoffrey C. Arthur, Coventry, England

[73] Assignee: Abrasive Developments Limited, Henley in Arden, England

[21] Appl. No.: 118,188

[22] Filed: Feb. 4, 1980

[30] Foreign Application Priority Data

Feb. 17, 1979 [GB] United Kingdom ................ 5658/79

[51] Int. Cl.³ ............................................ B01D 21/24
[52] U.S. Cl. ................................. 210/11 S; 210/528; 210/540
[58] Field of Search ................ 210/538, 540, 112–114, 210/11 S, 528, 529, 533–536

[56] References Cited

U.S. PATENT DOCUMENTS

| | | | |
|---|---|---|---|
| 2,611,489 | 3/1954 | Scott | 210/532 |
| 2,822,928 | 2/1958 | Wormser et al. | 210/538 X |
| 3,722,698 | 10/1973 | Hampton | 210/532 |
| 3,741,399 | 12/1973 | Peterson | 210/532 |
| 3,947,355 | 3/1976 | Irwin | 210/540 X |

FOREIGN PATENT DOCUMENTS

| | | | |
|---|---|---|---|
| 390989 | 4/1933 | United Kingdom . | |
| 483582 | 4/1938 | United Kingdom . | |
| 1501021 | 2/1978 | United Kingdom . | |
| 1611489 | 12/1979 | United Kingdom | 210/532 |

*Primary Examiner*—Thomas G. Wyse
*Attorney, Agent, or Firm*—Klarquist, Sparkman, Campbell, Leigh, Whinston & Dellett

[57] ABSTRACT

A separation apparatus (10) for separating a solid or viscous liquid component (28) from a mixture with a readily flowable liquid component (29) of slightly greater specific gravity, for example separating a heavy viscous grease from water. A preferred form of apparatus comprises an upright cylindrical tank (11) including a central cylindrical core (14) and an outer wall between which a separation channel is defined. The channel has a spiral ramp (12) defining its base and is swept by an upright skimmer paddle (24) driven for rotation about the axis of the tank (11). Two apertures are provided in the ramp (12), the first aperture (30) having a trap-door (32) which is normally biassed open and which is closed by impact from a mass of the viscous or solid components (28) as it is swept up the ramp. The liquid component (29) tends to precede the solid or viscous liquid component and so has reached the trap-door (32) before it closes and discharges through this first aperture. The trap-door is then closed by the solid or viscous material which then proceeds up the ramp and is discharged to the second aperture (13). The skimmer paddle (24) there drops suddenly into the second aperture (13) and is then rapidly forced upwardly by a cam track (36) to flick the solid or viscous component (28) off the paddle (24). The apparatus is intended particularly for use in separating grease having metal contamination from the treatment water used for wet blasting of components.

7 Claims, 7 Drawing Figures

APPARATUS FOR SEPARATING A SOLID OR VISCOUS LIQUID COMPONENT FROM A MIXTURE

BACKGROUND OF THE INVENTION

1. Field of the Invention

This invention relates to apparatus for separating a solid or viscous liquid component from a mixture with a readily flowable liquid component of slightly greater specific gravity.

The invention was devised particularly for use in separating heavy contaminated viscous grease from treatment water used in wet blasting so that the water can be recirculated and the grease discarded.

2. Description of the Prior Art

Separation of this combination of heavy grease and water has hitherto caused considerable difficulty because the grease has a specific gravity only slightly less than the water and hence only just floats on the water. Where mechanical separation has previously been attempted by skimming settlement tanks for example, there has been a tendency for the grease to dip below the water surface as mechanical skimmers pass along the tank. The settlement tanks require to be quite large in view of the relatively slow separation of the grease layer from the water with which it is mixed so that, in addition to separation being inefficient, large areas of floor space have had to be given over to settlement tanks and the capital cost of providing separation means has been high.

Heavy viscous grease is difficult to remove from skimmers used in settlement tanks so that quite elaborate cleaning arrangements have been required to prevent excessive build-up on the skimmers.

In the field of sewage treatment, it is known, for example from British Pat. Nos. 390,989 of Mills, 483,582 of Hartley and 1,501,021 of Ecodyne Corporation, to skim a floating scum from the top of a settlement tank up an inclined ramp or "beach plate" and into a collection outlet. It is inherent in such apparatus that a quantity of the liquid in which the scum is floating is also discharged to the outlet. The only selectivity available is due to the difference in specific gravity between the liquid and the floating scum.

Such techniques are not directly applicable to the separation of heavy grease from water for example because the difference in specific gravity between the materials to be separated is so slight that an undesirably large proportion of the water would be discarded with the grease.

The present invention was devised in an attempt to overcome or reduce these disadvantages which are at present encountered in the separation of viscous greases from treatment water used in wet blasting. However, the invention is of more general applicability and may be used in other separation processes in which the solid or viscous liquid is to be separated from a mixture with a readily flowable liquid component of slightly greater specific gravity.

SUMMARY OF THE INVENTION

It is an object of the invention to provide a new or improved apparatus for separating such a mixture.

According to the invention there is provided apparatus for separating a solid or viscous liquid component from a mixture with a readily flowable liquid component of slightly greater specific gravity, the apparatus comprising:

a tank;

inlet means for supplying the mixture to the tank;

an inclined ramp extending upwardly from below the surface of the mixture in the tank to a higher level;

first and second aperture means associated with the ramp a closure means for the first aperture means operable by impact of a substantial mass of material to close the first aperture means, biasing means for the closure means tending to bias the closure means open; and moving skimmer means adapted to skim through the mixture at least adjacent the ramp and to skim the surface of the ramp carrying a portion of the mixture;

the speed of movement of the skimmer means being so selected in relation to the components of the mixture that at least a substantial proportion of the readily flowable liquid component precedes the solid or viscous liquid component up the ramp and flows through the first aperture, the solid or viscous liquid component becoming consolidated into a mass adjacent the skimmer means sufficient then to operate the closure, and the solid or viscous liquid component continuing along the ramp to the second aperture means.

Preferably, the skimmer means undergoes a sharp change in position or orientation at the second aperture means to remove the solid or viscous liquid component therefrom.

The apparatus may be provided with a cam track to guide the skimmer means sharply upwardly as it traverses the second aperture means to cause such a sharp change.

The skimmer means may comprise an upright paddle mounted on a variable height linkage.

The variable height linkage may comprise a parallelogram linkage.

The tank may be generally cylindrical and the ramp may comprise a generally spiral base of the bank or of a portion of the tank.

The skimmer means may, in this case, be mounted for driven rotation about a central axis of the circular tank.

BRIEF DESCRIPTION OF THE VIEWS OF THE DRAWINGS

The invention will now be described in more detail by way of example only with reference to the accompanying drawings in which:

FIG. 2 is a plan view of the apparatus shown in FIG. 1 and indicating the section line on which FIG. 1 is taken;

DESCRIPTION OF THE PREFERRED EMBODIMENT

Figure 1:
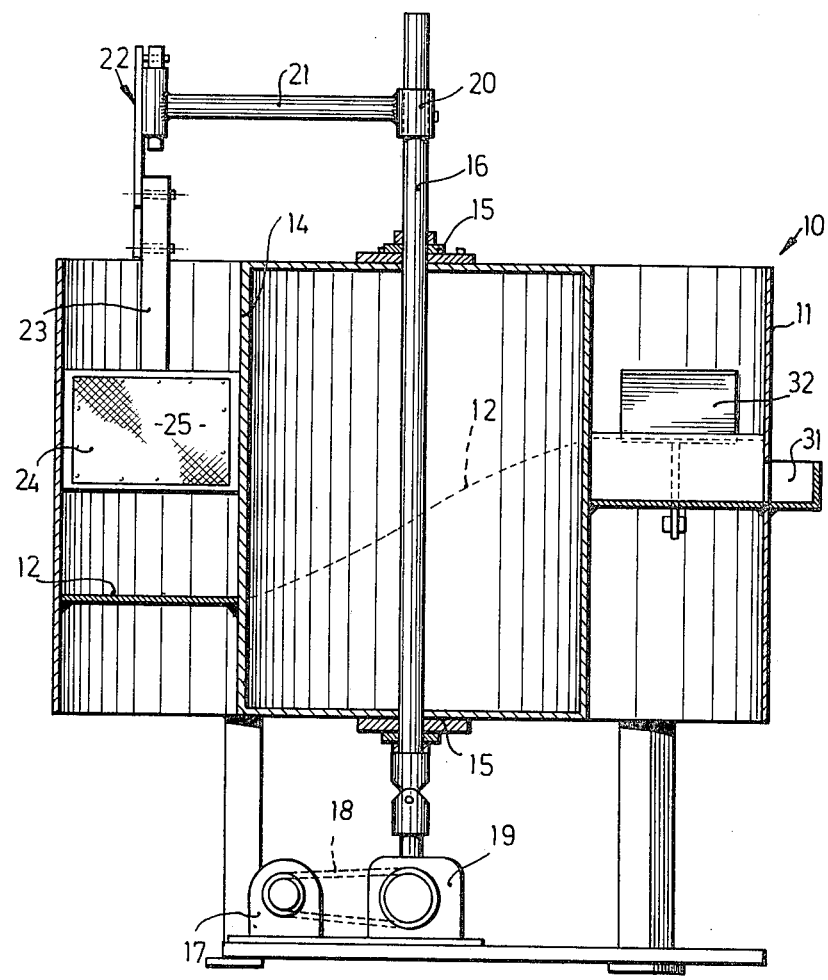
FIG. 1 is a vertical sectional view of a separating apparatus embodying the invention.
Figure 2:
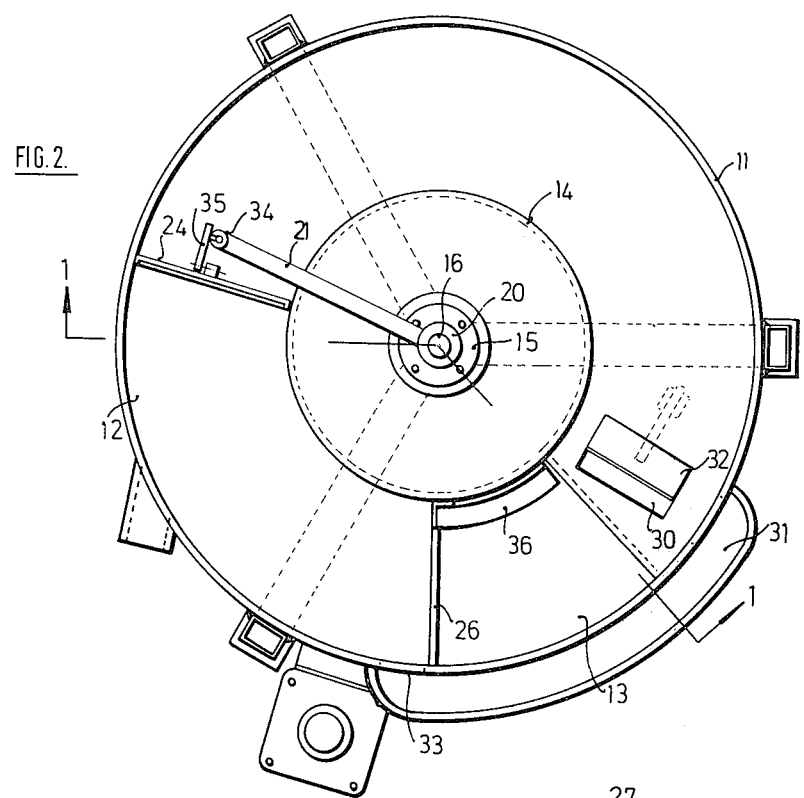
Figure 3:
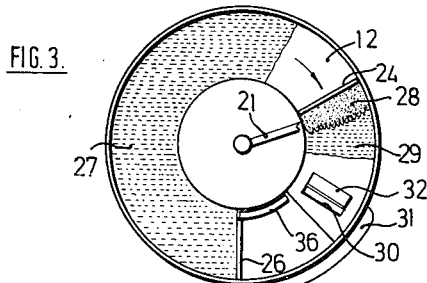
FIGS. 3 to 6 inclusive are diagrammatic plan views of the separating apparatus in use, certain parts having been omitted for clarity and these Figures illustrate successive stages in a separation process.

Referring to FIGS. 1 and 2 of the drawings, the separating apparatus is generally indicated at 10 and comprises a cylindrical tank 11 having a base in the form of a ramp 12 extending throughout most of its circumference. A portion of the circumference of the tank 11 does not have a base ramp but provides an aperture 13. The tank 11 has a central core 14 which is in the form of a cylindrical drum concentric with the tank wall. The drum has a set of bearings 15 which journal a shaft 16 of the operating mechanism. The shaft is driven by a motor 17 via a belt drive 18 and suitable gearing 19.

A collar 20 is fixed on the upper end of the shaft 16 and carries a rigid horizontal arm 21, at the outer end of which is disposed a variable geometry linkage generally indicated at 22 and described in more detail below with reference to FIG. 7 of the drawings. The linkage 22 carries, on a vertical downwardly depending arm 23, a skimmer paddle 24 which comprises a frame and a central liquid permeable msh screen 25.

In use, the tank 11 is supplied with a quantity of a mixture to be separated. The mixture will include a liquid component which is readily flowable, for example water and will also include a solid component or a viscous liquid component of slightly less specific gravity. This second component may comprise, for example, a pulverent material having the appropriate specific gravity or may comprise a heavy grease, for example contaminated grease picked up by treatment water during a wet blasting process. The mixture is confined within the region of the tank bounded by the spiral base ramp 12, the outer wall of the tank 11, the core 14 and an upright retaining wall 26 provided adjacent the aperture 13.

Referring now to FIGS. 3 to 6 of the drawings, the position which is occupied by the mixture 27 can readily be seen. It will be appreciated that the ramp 12 is in the form of a helix as can be seen from FIG. 1 of the drawings, and hence the liquid level will determine how much of the ramp 12 is covered by the mixture. In the example shown, somewhat over one half of the circumference of the tank is occupied by the mixture 27.

The skimmer paddle 24 is rotated through the mixture 27 and, by virtue of the variable geometry linkage 22, and its own weight, will come into contact with the ramp at a region within the body of the mixture 27 spaced by perhaps one third of the circumference of the tank from the retaining wall 26. The skimmer paddle 24 is rotated clockwise as shown by the arrow.

The effect of the skimmer paddle moving through the mixture will be to gather before it a quantity of the solid or viscous liquid component whilst tending to allow the flowable liquid component such as water to pass right through the mesh 25. However, a certain amount of the flowable liquid component will be trapped by the paddle if the apertures therein are obscured by the solid or viscous liquid material.

Referring specifically to the separation of heavy grease from treatment water, the paddle will pick up a substantial amount of the grease from the mixture 27 but, because the grease tends to clog the holes in the mesh 25 of the skimmer paddle, some water will also be trapped. The water and the grease will be propelled along the ramp as the skimmer paddle is rotated beyond the surface level of the mixture 27. In the position shown in FIG. 3 of the drawings, it can be seen that the relatively viscous grease 28 tends to build up, under the force exerted by the skimmer paddle 24, into a substantial consolidated mass, whereas at least most of the water flows rapidly up the ramp as illustrated at 29, in advance of the mass of grease 28.

The ramp is provided with a liquid aperture 30 which is in the form of a slot extending across the surface of the ramp and communicating with a conduit 31 provided externally of the tank 11. The aperture 30 has a closure 32 which is normally biased opened, for example by spring means or biasing weights. However, it can be shut over the liquid aperture 30 if it is forced downwardly by contact with a substantial mass of material.

Figure 4:
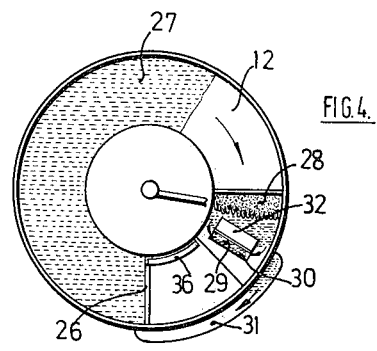
Figure 5:
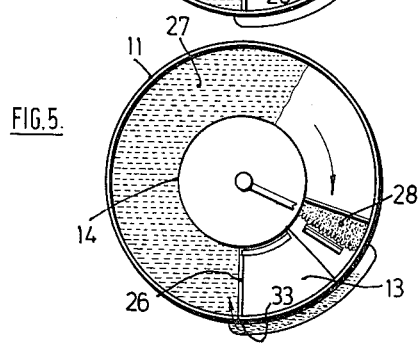

The arrangement is illustrated in operation in FIGS. 4 and 5 of the drawings. In FIG. 4 of the drawings, the water 29 has reached a position where it flows round the closure 32 and out of the liquid aperture 30, into the conduit 31. From this it is gravity fed back into the tank via a recirculation opening 33. In a continuous process where the tank is continuously topped up with contaminated liquid, the water could alternatively be discharged separately.

Figure 6:
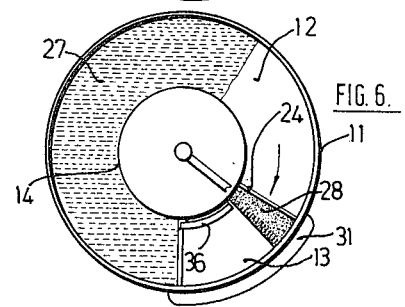

At the time when the water 29 is discharged, the consolidated mass of grease 28 is still some distance away from the liquid aperture 30. In the condition shown in FIG. 5 of the drawings, the water has passed through the liquid aperture 30 and the mass of grease 28 has advanced so as to come into contact with the closure 32. The weight of the consolidated mass of grease forces the closure 32 downwardly over the liquid aperture 30, thereby closing it off and preventing access of grease into the liquid aperture. The grease continues to be swept along by the skimmer paddle 24 as shown in FIGS. 5 and 6 of the drawings, until it reaches the aperture 13, through which it is discharged.

Figure 7:
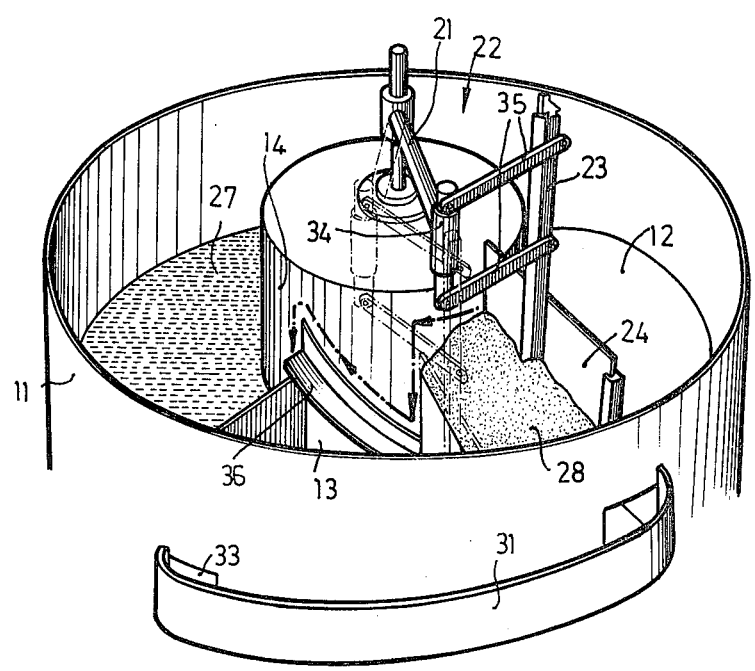
FIG. 7 is a perspective view of part of the apparatus in use at the stage of the separation process immediately following on from that shown in FIG. 6 in diagrammatic form.

This stage is shown in FIG. 7 of the drawings which also illustrates in more detail the variable geometry linkage generally indicated at 22.

As seen in FIG. 7, the horizontal arm 21 carries an upright post 34 which has a pair of parallelogram arms 35 pivoted to its upper and lower ends respectively. The remote ends of these arms are pivoted to the downwardly depending arm 23 referred to above. Thus, it will be seen that the skimmer paddle remains vertically upright at all times but can move upwardly and downwardly within the limits of the parallelogram linkage.

When the skimmer paddle brings the mass of grease 28 to the extreme forward edge of the ramp, the grease may tend to adhere to the paddle but this tendency is reduced because the paddle drops sharply downwardly under its weight and that of the adhering grease as it reaches the aperture 13. The core 14 of the separating apparatus is provided with a cam track 36 which immediately engages the lower edge of the skimmer paddle 24 and forces it rapidly upwards as the rotation of the horizontal arm 21 continues. The path followed by the skimmer paddle is illustrated by the arrows in FIG. 7, which also illustrates in chain dotted lines the approximate positions of the elements of the variable geometry linkage 22 when the skimmer paddle has passed the end of the ramp and dropped at the position of the aperture 13.

The sudden movement of the skimmer paddle downwardly and then upwardly in the region of the aperture tends to flick the grease off the paddle and into the aperture. A suitable receptacle for the grease can be placed beneath the aperture 13 and, to this end, the side of the tank 11 may be cut away to enable the receptacle to be moved into place and later removed.

It will be seen that the apparatus enables separation of materials of very similar specific gravities to take place. If a liquid contains a solid or viscous liquid which has a greater specific gravity, there is a tendency for the latter material to sink to the bottom and hence settlement tanks can be used to separate the mixture. If the sepcific gravity of the solid or viscous component is much less than that of the liquid, it can readily be removed by skimming the top surface of the liquid. However, where the material has a specific gravity only slightly greater than that of the liquid, it becomes extremely difficult to skim it from the top of the liquid because there is a tendency for the skimming blade to cause the material to bob under the surface of the liquid and reappear when the skimmer has passed, or alternatively the action of the skimmer simply breaks the material up and mixes it more thoroughly with the liquid. It will be seen that the apparatus described above, by combining the use of a skimmer with an inclined ramp enables the material to be caught by the skimmer without danger of it then submerging into the liquid. The flowable liquid component and the solid or relatively viscous liquid component are separated by the use of two discharge apertures. Clearly, if the skimmer paddle is rotated at too low a speed, the solid or viscous liquid component of the mixture may be uniformly distributed through the flowable liquid but, where the paddle speed is fairly high, the solid or viscous nature of this component tends to cause it to build up into a coherent mass adjacent the paddle, the flowable liquid component tending to be pushed before this mass and hence being able to leave the apparatus via the liquid aperture. The precise speed at which the skimmer paddle should be rotated will depend on the materials to be separated and can be determined empirically.

Various modifications of the apparatus are possible, for example in the positioning of the discharge apertures and the arrangements for supporting the skimmer paddle. The apparatus may also be modified by using a linear tank instead of a cylindrical tank. In this case, the paddle will be arranged for linear travel along the tank and the ramp will be an inclined base of the tank. It is possible to use more than one skimmer paddle in the apparatus.

It will also be appreciated that the apparatus can be run either continuously or for batch separation of mixtures.

I claim:

1. Apparatus for separating the components of a mixture, the mixture comprising a solid or viscous liquid component and a readily flowable liquid component, the flowable liquid component having a specific gravity which is only slightly greater than that of the solid or viscous liquid component, the apparatus comprising:
a tank having a closed bottom and a top;
inlet means for supplying the mixture to the tank;
a separation ramp located within the tank and being inclined upwardly between the bottom and the top of the tank and above the level of the mixture to be received in the tank;
a first aperture means in communication with the ramp for egress of the readily flowable liquid from the tank, closure means for the first aperture means, biasing means for biasing the closure means open, the biasing means including means for imparting a force to the closure means to maintain the first aperture means open to receive the flowable liquid component and to enable the first aperture means to close by flow of the solid or viscous liquid component past the closure means as the mixture flows upwardly on the ramp along a mixture flow path;
second aperture means in communication with the ramp and positioned downstream from the first aperture means along the mixture flow path;
skimmer means for skimming through the mixture at least adjacent the ramp and for skimming over the ramp and thereby skimming the mixture towards the first and second aperture means;
means for rotating the skimmer means through the mixture at a speed such that the skimmer means drives the mixture with the readily flowable liquid component preceding the solid or liquid viscous component up the ramp and through the first aperture means and with the solid or viscous liquid component following behind and closing the first aperture means, and with the solid or viscous liquid component directed past the closure means towards the second aperture means.

2. Apparatus according to claim 1 wherein the skimmer means undergoes a sharp change in position or orientation at the second aperture means to remove the solid or viscous liquid component therefrom.

3. Apparatus according to claim 2 wherein a cam track is provided to guide the skimmer means sharply upwardly as it traverses the second aperture means to cause said sharp change.

4. Apparatus according to claim 1 wherein the skimmer means comprises an upright paddle mounted on a variable height linkage.

5. Apparatus according to claim 4 wherein the variable height linkage comprises a parallelogram linkage.

6. Apparatus according to claim 1 wherein the tank is generally cylindrical and the ramp comprises a generally spiral base of at least a portion of the tank.

7. Apparatus according to claim 6 wherein the skimmer means is mounted for driven rotation about a central axis of the cylindrical tank.

* * * * *